United States Patent [19]

Bissinger

[11] 4,381,017

[45] Apr. 26, 1983

[54] AIR INLET, ESPECIALLY A TWO-DIMENSIONAL AIR INLET SET AT AN ANGLE ON ONE SIDE FOR GAS TURBINE JET PROPULSION PLANTS FOR DRIVING AIRPLANES

[75] Inventor: Norbert Bissinger, Siegertsbrunn, Fed. Rep. of Germany

[73] Assignee: Messerschmitt-Boelkow-Blohm Gesellschaft mit beschraenkter Haftung, Munich, Fed. Rep. of Germany

[21] Appl. No.: 244,107

[22] Filed: Mar. 16, 1981

[30] Foreign Application Priority Data

Apr. 5, 1980 [DE] Fed. Rep. of Germany ....... 3013265
Feb. 25, 1981 [DE] Fed. Rep. of Germany ....... 3107002

[51] Int. Cl.$^3$ .............................................. F15B 27/02
[52] U.S. Cl. .................................... 137/15.1; 138/45; 244/53 B

[58] Field of Search .............................. 137/15.1, 15.2; 244/53 B; 138/45

[56] References Cited

U.S. PATENT DOCUMENTS 2,772,620 12/1956 Ferri ........................... 244/53 B UX
3,589,379 6/1971 Daves ................................. 137/15.1

Primary Examiner—Alan Cohan
Attorney, Agent, or Firm—W. G. Fasse; D. H. Kane, Jr.

[57] ABSTRACT

In an air inlet for a gas turbine jet propulsion plant in which the inlet channel is curved, separation flow is generated near the inner wall surfaces of the inlet at certain angles of attack. A flow guide fence is employed which reaches into the air inlet channel a small extent radially so that separation flow is caused to follow the channel and substantially dissolves itself by the time it reaches the compressor entrance so that flow to the compressor is substantially homogeneous.

5 Claims, 4 Drawing Figures

AIR INLET, ESPECIALLY A TWO-DIMENSIONAL AIR INLET SET AT AN ANGLE ON ONE SIDE FOR GAS TURBINE JET PROPULSION PLANTS FOR DRIVING AIRPLANES

CROSS-REFERENCE TO RELATED APPLICATIONS

The present invention relates to corresponding German Patent Applications: (1) P 30 13 265.1, filed on Apr. 5, 1980 in the Federal Republic of Germany, and (2) P 31 07 002.7, filed on Feb. 25, 1981 in the Federal Republic of Germany. The priority of said German Patent Applications is hereby expressly claimed.

BACKGROUND OF THE INVENTION

The invention relates to an air inlet, particularly a two-dimensional air inlet set at an angle on one side for gas turbine jet propulsion plants for driving of airplanes, having an air inlet channel curved in space, especially doubly curved, and leading to the compressor of the propulsion plant, and further having, especially one, inlet cross-section for the supersonic operation controllable by means of adjustable ramps arranged overhead which are in the raised position during subsonic operation and which are tilted down during supersonic operation, so that a variable, convergent-divergent air inlet geometry is produced in the air inlet.

The air inlet of an aircraft has the purpose to convert as large as possible a proportion of the kinetic energy of the onflowing air into pressure energy while reducing its speed. This energy recovery may be substantial particularly at higher flight mach numbers. In order to optimize the energy recovery, the collected and compressed air must be supplied at low loss and in a homogeneous condition as well as in a properly dosed quantity to the propulsion plant. Flow losses result primarily due to air friction and compression shocks.

Particular attention must thereby also be paid to the resistances of the external flow which must be kept as low as possible.

During starting and at low flight speeds the air is supplied to the air propulsion plant with a large volume due to the low pressure at the inlet end. This means that the mechanically narrowest flow cross-section of the air inlet must be dimensioned to be large. Contrary thereto, at high supersonic flights the air volume at the inlet end is extremely low due to the produced high pressure. This means that the mechanically narrowest flow cross-sectional area must be dimensioned to be as small as possible in order to maintain the desired position of the compression shocks in the entrance zone of the air inlet.

Additionally, it is today required of high performance aircraft having a supersonic capability to be suitable for air combat in the subsonic range. For this purpose it is necessary to operate at high aircraft angles of attack which cause a slanted onflow. Such slanted onflow causes a flow separation or stalling in front at the lower lip of the air inlet which cause separations near the bottom which extend far into the air inlet channel or into the subsonic zone of the diffuser.

This adverse flow condition is particularly critical in its effect where the propulsion plants are installed in the aircraft fuselage and where the supersonic air inlets are arranged laterally of the aircraft fuselage. In this instance the doubly bent air supply channels from the air inlet to the respective propulsion plant aggrevate the adverse flow condition due to the flow phenomena to be described in the following.

The undisturbed flow which is present above the above mentioned separation flow near the bottom which is subject to large losses, runs, due to the inertia of its mass, with high speed against the inner surface of the channel wall which is bent toward the aircraft fuselage and forms an outer channel wall. Stated differently this undisturbed flow runs against the inner surface of the outer channel wall. Thus, a reduced pressure zone is formed in the area of the opposite inner flow wall and this reduced pressure zone calls for being filled aerodynamically. This is done by the separation flow near the bottom which contains less kinetic energy. The separation flow, due to its lateral flow off movement within the air inlet toward the inner flow wall on which it slides up, excites a spin flow. The energy of this spin flow is further amplified due to the fact that the flow present on the inside of the outer flow wall flows into the zone near the bottom which now is becoming empty, whereby this undisturbed flow displaces the flow which originally was separated near the bottom, further against the inner channel wall. A further intensification of this spin phenomenon may be caused by the following counter curvature of the air inlet channel. This is so because the undisturbed flow which up to this point was hugging the inner surface of the flow outer wall, is carried to the other wall of the air inlet channel downstream of the turning point in the curvature. Thus, the other wall now becomes the flow outer wall, whereby the original separated flow near the bottom is displaced upwardly toward the inner flow wall of the counter bend.

Today, gas turbine jet propulsion plants for high performance aircraft are altogether equipped with a multi-stage axial compressor. On the one hand, the advantages of an axial compressor are uncontested. However, on the other hand, an axial compressor has only a narrow stable working range and it is rather sensitive in its reaction to air inhomogenities. This weakness of the axial compressor may be counteracted by dividing the same into a plurality of compressor groups having different r.p.m.s. Further, this weakness may be counteracted by adjusting the guide vanes and by bleeding of compressor air between individual compressor stages. By these measures it is possible to avoid to a large extent the dreaded compressor pumping which occurs due to strong irregularities in the flow. When compressor pumping occurs, the air flow is interrupted between the individual compressor stages which in turn may lead to a substantial power reduction in the propulsion plant even to a total collapse of the propulsion process.

It follows from what has been said above that the propulsion plant of an aircraft comprising the air inlet and the gas turbine engine produces a thrust with good efficiency in all power ranges only if the air inlet and the engine cooperate aerodynamically in a stable manner. As mentioned, this may not be accomplished at all times under certain conceptual circumstances of the air inlet and under extreme operating conditions as in the present instance when flying with large aircraft angles of attack.

OBJECTS OF THE INVENTION

This is where the invention begins. It is the objective of the invention to suggest special measures which prevent the adverse spin formation of the air stream flowing to the compressor or which suppress the spin formation at least to such an extent that a stable operation of the compressor remains assured so that the precompressed air is supplied to the compressor in a sufficiently homogeneous condition.

SUMMARY OF THE INVENTION

According to the invention this objective is achieved in that -as viewed in the circumferential direction- at least one flow guide fence is arranged in the zone of the air inlet channel in which, due to flight conditions, particularly angles of attack of the aircraft used in flight, a separation flow occurs. Said flow guide fence following particularly the longitudinal central plane of the air inlet channel, said flow guide fence having an upstream end located in the area of the beginning of the channel curvature and a downstream end extending at least to the end of the channel curvature, said downstream end extending, in case of a doubly bent air inlet channel, at least to the turning point in the curvature.

In an embodiment of the invention, especially in connection with a two dimensional air inlet set at an angle on one side, the flow guide fence is arranged at the air inlet bottom.

Further, in a modification of the invention the flow guide fence is provided at its upstream end with a chamfering starting at the inner wall.

The flow guide fence or fences according to the invention make sure that during subsonic operation under flight conditions which cause a local separation, such separation cannot flow off to the flow or curvature inner side or rather than this change of side is prevented. Stated differently, the separation flow follows substantially the course of the channel, whereby the separation flow dissolves itself substantially completely by the time it reaches the compressor entrance. Thus, the flow supplied to the compressor is substantially homogeneous and spin free.

The arrangement according to the invention for two dimensional air inlets set at an angle on one side and provided with adjustable ramps arranged overhead, has a two-fold advantage. On the one hand the invention is suitable to substantially improve the operation of the air inlet during subsonic operation at large aircraft angles of attack. On the other hand, the invention influences in a surprising manner the operational characteristic of the air inlet also during supersonic flight as will be explained in more detail below.

The phenomenon known in technical parlance as "humming" has been found to be a special disturbance of the air inlet flow in supersonic diffusers. This disturbance occurs in the strongly subcritical operational range. Stated differently, it occurs, for example, when, as a result of a load change the counter pressure of the engine at the input end is increased while simultaneously maintaining a constant flight mach number and an unchanged inlet geometry. Under such circumstances the final compression shock travels upstream in front of the inlet edge where it does not find any stable position and thus oscillates back and forth in a nonstationary manner. Such oscillation results in a substantial drop of the mean pressure due to flow non-uniformities and thus in a reduction of the air throughput and of the pressure recovery. Additionally, such oscillation may cause the mechanical destruction of the air inlet structure. It is known to arrange upstream of the engine an air bleeding flap which opens during a subcritical operating condition in order to de-throttle the air inlet for the purpose to return the escaped "straight shock" back into its predetermined stable condition. Such air bleeding, however, on the other hand means a power loss due to the work or energy content of the bled air which has been previously compressed by passing through the air inlet. Thus, one resorts to air bleeding only if a reduction of the cross-sectional area of the air inlet by means of adjusting the upper ramps is not acceptable anymore due to aerodynamic reasons for the condition of the flow downstream of the ramps. Stated differently, it is not possible to adjust the upper movable ramps as desired far enough into the air inlet for the reduction of the air inlet cross-sectional area because that would cause the concluding, straight compression shock to lose its stable position and the compression shock would fluctuate in a forward direction in an adverse manner as far as the propulsion process is concerned.

For minimizing the power losses due to bleeding of pressurized air in the sub-critical operating condition, it is thus customary to adjust the movable upper ramps into the air inlet as much as possible, whereby however, a flow separation may occur downstream of the last upper ramps. Thus, during supersonic flight when the engine has a minimal air requirement, that is, when the inlet cross-sections are adjusted to be small, the reverse condition occurs as compared to subsonic flight when larger aircraft angles of attack are employed. During supersonic flight the undisturbed lower flow also streams through the curvature of the air inlet channel against the inside surface of the outer channel wall, whereby a reduced pressure zone forms itself in the area of the inner flow wall, said reduced pressure zone calling for a filling. This filling is accomplished by the disturbed upper separation flow which now flows off laterally and downwardly, whereby a spin flow is generated which is adverse to the axial compressor as has been described in connection with the subsonic operation. Such spin flow causes most adverse effects when the direction of rotation of the spin is opposite to the rotation of the compressor.

The flow guide fence according to the invention makes sure that the undisturbed, now lower flow cannot flow off altogether to the inner side of the flow outer wall. Rather, this flow remains distributed substantially over the channel width so that no effective, one sided reduced pressure zone can form itself in the air inlet channel. Thus, a sufficiently homogeneous air flow substantially spin free is supplied to the engine compressor.

The apparatus according to the invention provides with the smallest structural effort, particularly by reducing the spin, a special contribution to the maintaining of the full operability of the propulsion plant comprising the air inlet and the gas turbine engine. This advantage is achieved in the subsonic, as well as in the supersonic range during extreme operating situations.

BRIEF FIGURE DESCRIPTION

An example embodiment of the invention is illustrated in the drawing, wherein.

Figure 1:
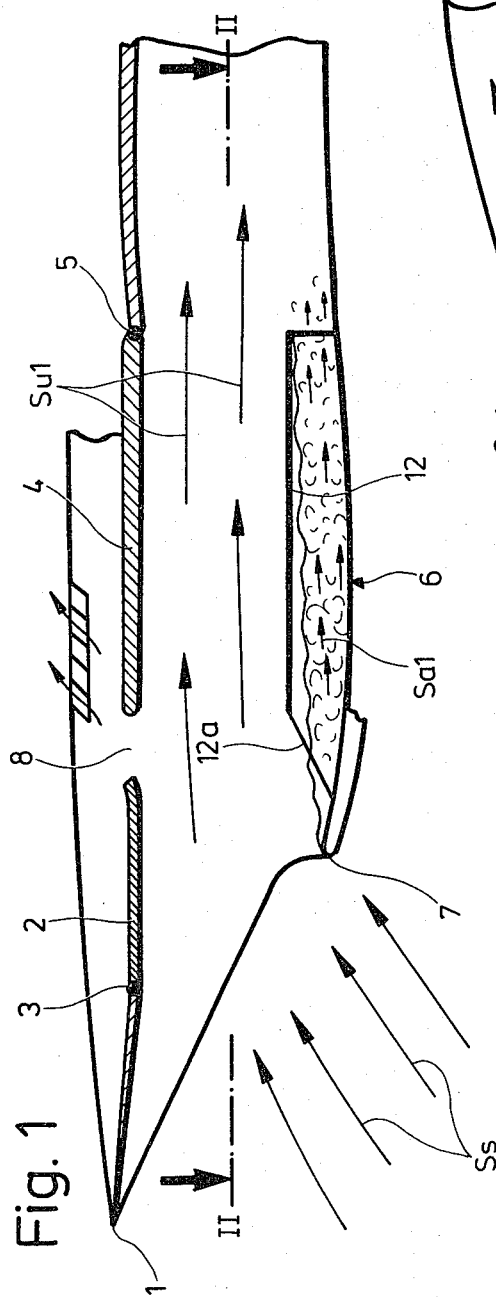
FIG. 1 shows a longitudinal section through a two-dimensional, air inlet set at an angle on one side during the subsonic operation with a slanted onflow.

DETAILED DESCRIPTION OF PREFERRED EXAMPLE EMBODIMENTS AND OF THE BEST MODE OF THE INVENTION

The illustrated two-dimensional (plane) one sided slanted or angularly set inlet constructed as a supersonic air inlet, comprises substantially an upper front rigid ramp 1, a movable upper second ramp 2 including a hinge or journal 3, a movable upper third ramp 4 with a hinge or journal 5 and an air inlet bottom 6 having a lower front rigid inlet lip 7. An airgap 8 remains between the two movable ramps 2 and 4. The entire air inlet channel is designated by reference number 9 and comprises a front channel bender 10 and a rear channel counter bender 11. The turning point W of the curvature is located between the two benders.

A flow guide fence 12 is arranged on the inlet bottom. The flow guide fence 12 is reset relative to a front lower inlet lip 7 and is provided at its front end with a slanted chamfer 12a. The flow guide fence 12 follows the longitudinal center line M of the air inlet channel 9.

Figure 2:
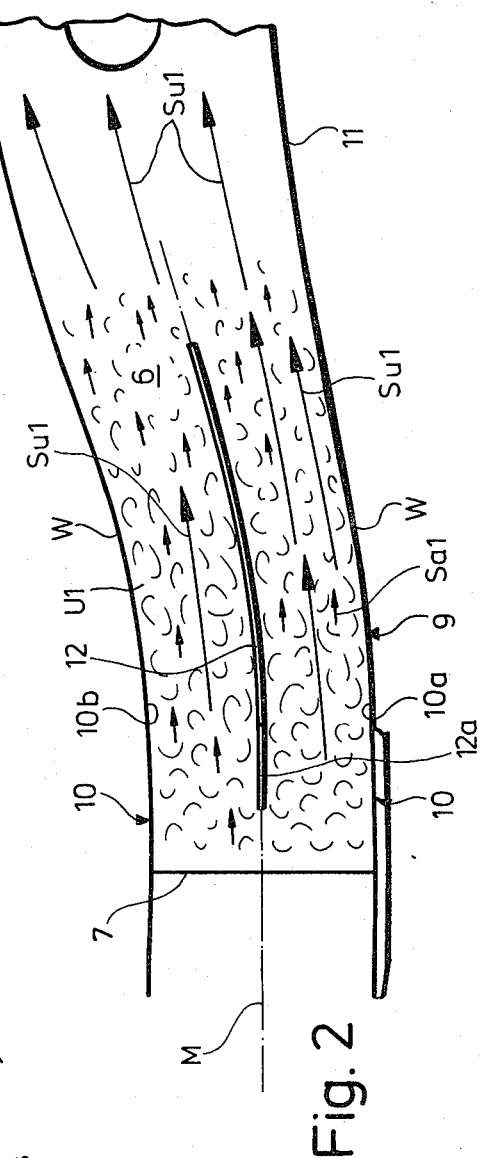
FIG. 2 is a sectional view along section line II—II in FIG. 1.

According to FIGS. 1 and 2, in the subsonic operation an aircraft is flown with a large aircraft angle of attack. As a result, a slanted on-flow Ss takes place relative to the air inlet, whereby directly above the inlet bottom 6 a spinning separation flow Sa1 is produced (short arrows). The undisturbed flow thereabove is designated with Su1. The undisturbed flow streams, due to the inertia of its mass, onto the inside of the flow outer wall 10a of the forward channel bender 10. Thus, more air mass is present on the side of the outer flow wall 10a (three long arrows Su1) than on the inner flow wall 10b (only one long arrow Su1). The flow guide fence 12 has the effect that at least the right side portion of the separation flow Sa1 adjacent to the bottom does not wander off into the reduced pressure zone U1 that has developed on the left flow wall 10b. Downstream of the turning point W in the curvature the undisturbed flow Su1 distributes itself in the counter-bender 11 under the force of the occurring centrifugal acceleration, again onto the entire flow cross-sectional area without the occurrence of a spin flow adverse to the axial compressor.

The separation flow Sa1 adjacent to the bottom dissolves itself gradually in the counter-bender 11 so that a sufficiently homogeneous flow is supplied to the axial compressor.

Figure 3:
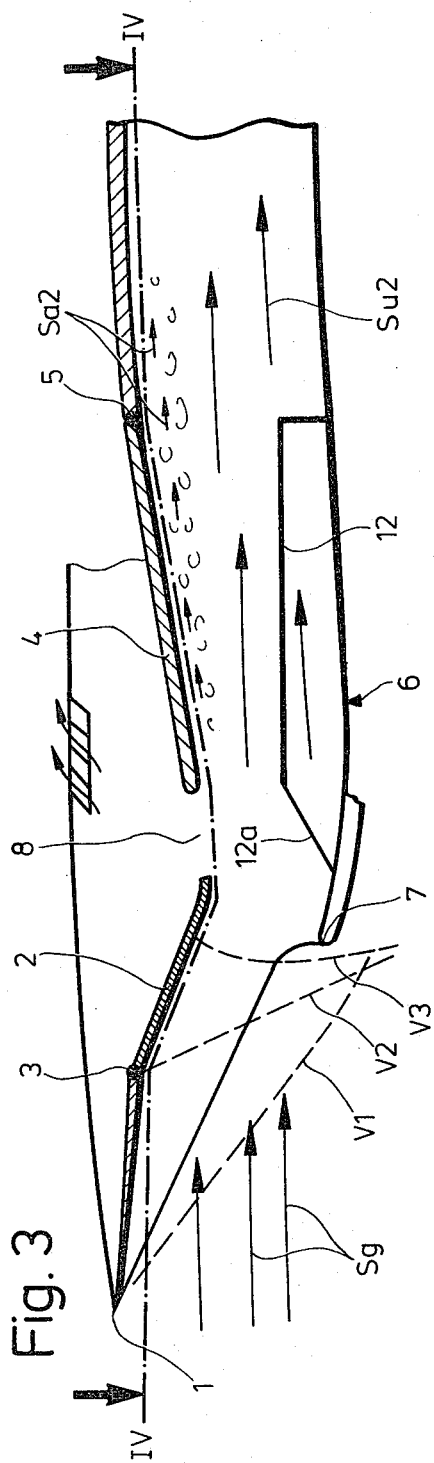
FIG. 3 is a longitudinal section through an inlet set at an angle during the supersonic operation.
Figure 4:
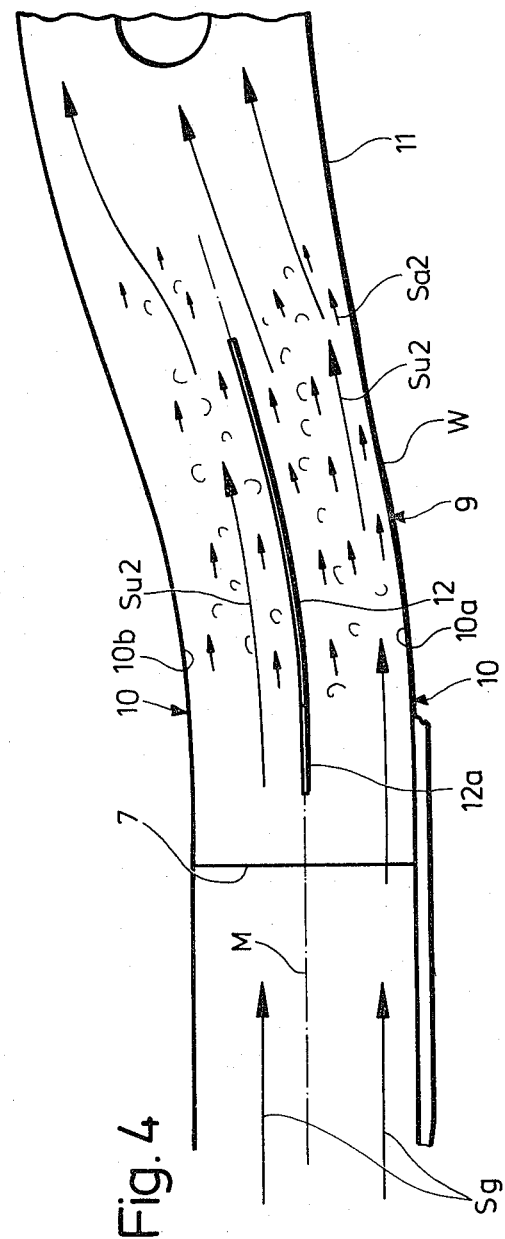
FIG. 4 is a section along line IV—IV in FIG. 3.

FIGS. 3 and 4 characterize the air inflow during the supersonic operation with a straight inlet flow Sg. In this instance several slanted compression shocks or thrusts V1 and V2 and a final straight thrust or shock V3 occur behind which subsonic flow prevails. A whirling or spinning separation flow Sa2 develops downstream of the last ramp 4, particularly at larger angles of slants or attack of the movable ramps 2 and 4. An undisturbed flow Su2 is present below these ramps. At least that portion of this flow Su2 which is present to the left side of the flow guide fence 12, that is, the flow on the inside is prevented from also wandering off to the outside flow walls 10a. Thus, a substantially uniform distribution of the undisturbed flow Su2 over the entire width of the air inlet channel 9 or of the front channel bender 10 is provided. Accordingly, a reduced pressure zone does not develop in the area of the flow inner wall 10b whereby also the upper disturbed separation flow Sa2 remains uniformly distributed approximately over the channel width. Accordingly, a sufficiently homogenous air flow without any adverse spin is supplied to the axial flow compressor even during the supersonic flights.

The developing of an adverse spin in the air inlet may be avoided by an additional flow guide fence arranged laterally at the inner wall of the air inlet channel. Such additional flow guide fence may be desirable if a separation flow occurs laterally or at the inside of a side wall or at the inside of both side walls of the air inlet channel. Such separation flow or flows may occur in connection with an air inflow due to a special flight condition, for example, due to a strong yawing flight, that is, when the aircraft negotiates a narrow curve, whereby the aircraft is not turned at all or only a little in the direction of its longitudinal axis. However, it is also possible to arrange flow guide fences at each inner side of both air channel sides. Although the invention has been described with reference to specific example embodiments, it is to be appreciated that it is intended to cover all modifications and equivalents within the scope of the appended claims.

I claim:

1. In an air inlet for a gas turbine, especially a two-dimensional air inlet set at an angle on one side for gas turbine jet propulsion plants for driving airplanes, having an air inlet channel curved in space, especially double curved, and leading to the compressor of the propulsion plant, and further having, especially one, inlet cross-section for the supersonic operation controllable by means of adjustable ramps arranged overhead which are in the raised position during subsonic operation and which are tilted down during supersonic operation, so that a variable, convergent-divergent air inlet geometry is produced in the air inlet, the improvement comprising at least one flow guide fence (12) arranged in the zone of the air inlet channel (9) in which, due to flight conditions particularly angles of attack of the aircraft used in flight, a separation flow (Sa1) occurs, said flow guide fence (12) reaching substantially radially into said air inlet channel to an extent just sufficient to avoid disadvantages of said separation flow, said flow guide fence following particularly the longitudinal central plane (M) of the air inlet channel, said flow guide fence having an upstream end located in the area of the beginning of the channel curvature and a downstream end extending at least to the end of the channel curvature, said downstream end extending, in case of a doubly bent, air inlet channel (9 or 10, 11) at least to the turning point (W) in the curvature.

2. The air inlet according to claim 1, wherein the flow guide fence (12) or several flow guide fences (12) are arranged on the bottom (6) of the air inlet.

3. The air inlet according to claims 1 or 2, wherein at least one flow guide fence (12) is arranged on one or on both sides inside of the air inlet channel (9).

4. The air inlet channel according to claim 3, wherein the flow guide fence (12) comprises at its upstream end a chamfering (12a) starting at the inner wall of the air inlet channel.

5. The air inlet channel according to claim 1, wherein the flow guide fence (12) comprises at its upstream end a chamfering (12a) starting at the inner wall of the air inlet channel.

* * * * *